US010029693B2

(12) United States Patent
Sujan et al.

(10) Patent No.: US 10,029,693 B2
(45) Date of Patent: Jul. 24, 2018

(54) ACTIVE ACCELERATION LIMIT MANAGEMENT AND GEAR SHIFT SCHEDULING BASED ON DRIVING ENVIRONMENT

(71) Applicant: Cummins Inc., Columbus, IN (US)

(72) Inventors: Vivek A. Sujan, Columbus, IN (US); Jenni L. Muncie-Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 258 days.

(21) Appl. No.: 14/725,082

(22) Filed: May 29, 2015

(65) Prior Publication Data

US 2017/0043776 A1     Feb. 16, 2017

Related U.S. Application Data

(60) Provisional application No. 62/005,371, filed on May 30, 2014.

(51) Int. Cl.
| | |
|---|---|
| F16H 61/02 | (2006.01) |
| B60W 30/188 | (2012.01) |
| B60W 10/06 | (2006.01) |
| B60W 10/11 | (2012.01) |
| F02D 41/04 | (2006.01) |
| F02D 41/02 | (2006.01) |

(52) U.S. Cl.
CPC .......... *B60W 30/188* (2013.01); *B60W 10/06* (2013.01); *B60W 10/11* (2013.01); *F02D 41/021* (2013.01); *F02D 41/045* (2013.01); *F16H 61/0213* (2013.01); *B60W 2420/52* (2013.01); *B60W 2520/105* (2013.01); *B60W 2540/12* (2013.01); *B60W 2550/22* (2013.01); *B60W 2550/30* (2013.01); *B60W 2550/402* (2013.01); *F02D 2200/501* (2013.01); *F02D 2200/602* (2013.01); *F02D 2200/701* (2013.01); *F02D 2250/26* (2013.01); *F16H 2061/0223* (2013.01)

(58) Field of Classification Search
None
See application file for complete search history.

(56) References Cited

U.S. PATENT DOCUMENTS

| | | | | |
|---|---|---|---|---|
| 6,000,378 A | * | 12/1999 | Minowa ............... | B60W 10/06 123/436 |
| 8,972,087 B2 | * | 3/2015 | Takeuchi .............. | B60K 6/445 701/1 |
| 2001/0039230 A1 | * | 11/2001 | Severinsky ........... | B60H 1/004 477/3 |
| 2007/0205735 A1 | * | 9/2007 | Kiuchi .................. | B60K 6/365 318/432 |
| 2010/0197457 A1 | * | 8/2010 | Kuwahara ............ | F02D 11/105 477/107 |
| 2010/0217489 A1 | * | 8/2010 | Turski .................... | F02D 41/28 701/48 |
| 2010/0268416 A1 | * | 10/2010 | Arai ...................... | B60T 8/172 701/33.4 |

\* cited by examiner

*Primary Examiner* — Justin Holmes
(74) *Attorney, Agent, or Firm* — Faegre Baker Daniels LLP (57) ABSTRACT

A system and method for controlling performance of a vehicle engine by sensing and/or accessing data regarding the driving environment and adjusting at least one of an engine output torque limit and a shifting schedule for the vehicle based on the sensed data.

16 Claims, 7 Drawing Sheets

ACTIVE ACCELERATION LIMIT MANAGEMENT AND GEAR SHIFT SCHEDULING BASED ON DRIVING ENVIRONMENT

CROSS-REFERENCE TO RELATED APPLICATIONS

The present application claims the benefit of U.S. Provisional Patent Application Ser. No. 62/005,371, filed May 30, 2014, and entitled "ACTIVE ACCELERATION LIMIT MANAGEMENT AND GEAR SHIFT SCHEDULING BASED ON DRIVING ENVIRONMENT," the complete disclosure of which being hereby expressly incorporated herein by reference.

FIELD OF THE DISCLOSURE

The present disclosure generally relates to engine controls, and more specifically to active acceleration limit management and gear shift scheduling based on information about the driving environment.

BACKGROUND OF THE DISCLOSURE

In the trucking industry, many different, sometimes conflicting concerns exist for vehicle operators, vehicle owners, and other potentially affected parties. For example, in situations where the owner pays for the vehicle fuel, one of the owner's primary concerns may be fuel economy. In situations where the operator is paid by the load, primary concerns of the operator may include overall trip time and vehicle drivability. The owners and operators, as well as the public in general, are also concerned about safety.

In certain circumstances, the above-mentioned concerns are of increased importance. For example, in driving scenarios involving frequent vehicle velocity changes due to traffic, road characteristics, etc. (e.g., urban operation scenarios), fuel economy may be in direct conflict with overall trip time. A driver seeking to deliver a load under such circumstances may aggressively accelerate and decelerate to minimize trip time. Such driving behavior, however, reduces fuel economy. Accordingly, it would be desirable to implement a system and method that could control performance of the vehicle in a manner that permits safe vehicle operation with acceptable drivability characteristics and also improves fuel economy without unacceptably increasing trip time.

SUMMARY

According to one embodiment of the disclosure, a method is provided for controlling performance of a vehicle, comprising using one or more sensors to sense at least one of acceleration and deceleration of the vehicle, and using an electronic control module ("ECM") to adjust at least one of an engine output torque limit and a transmission shifting schedule for the vehicle in response to the sensed at least one acceleration and deceleration. In one aspect of this embodiment, using an ECM to adjust at least one of an engine output torque limit and a transmission shifting schedule comprises increasing the engine output torque limit in response to a decrease in a frequency of the sensed at least one acceleration and deceleration of the vehicle and decreasing the engine output torque limit in response to an increase in the frequency of the sensed at least one acceleration and deceleration of the vehicle. In another aspect, using an ECM to adjust at least one of an engine output torque limit and a transmission shifting schedule comprises increasing up/down shift points of the transmission shifting schedule in response to a decrease in a frequency of the sensed at least one acceleration and deceleration of the vehicle and decreasing the up/down shift points in response to an increase in the frequency of the sensed at least one acceleration and deceleration of the vehicle. In still another aspect, the method further comprises using the one or more sensors to sense a position of a brake pedal of the vehicle, and using the ECM to adjust the at least one engine output torque and transmission shifting schedule in response to the sensed brake pedal position. In another aspect, the method comprises accessing data from an on-board radar system, and using the ECM to adjust the at least one engine output torque and transmission shifting schedule in response to the on-board radar system data. In a variant of this aspect, using the ECM to adjust the at least one engine output torque and transmission shifting schedule in response to the on-board radar system data comprises comparing the on-board radar system data to expected data representing expected characteristics of neighboring vehicles to determine an extent to which traffic conditions are off-nominal. In another variant, the method further comprises accessing data from one or more proximity sensors mounted to the vehicle to determine a current traffic environment, and using the ECM to adjust at least one of an engine output torque limit and a transmission shifting schedule for the vehicle in response to the sensed at least one acceleration and deceleration and the current traffic environment. According to another aspect, the method further comprises accessing data from an enhanced navigation system, and using the ECM to adjust the at least one engine output torque and transmission shifting schedule in response to the enhanced navigation system data. In a variant of this aspect, the data from the enhanced navigation system includes an indication of at least one intersection ahead of the vehicle. In yet another aspect, the method comprises accessing data from a traffic light sensing system, and using the ECM to adjust the at least one engine output torque and transmission shifting schedule in response to on the traffic light sensing system data. In a variant, the data from the traffic light sensing system includes an indication of a status of at least one traffic light ahead of the vehicle. In another aspect, the method further comprises accessing data from a telematics system, the data including an indication of traffic conditions ahead of the vehicle, and using the ECM to adjust the at least one engine output torque and transmission shifting schedule in response to the telematics system data. In still another aspect, using the ECM to adjust at least one of an engine output torque limit and a transmission shifting schedule for the vehicle includes at least one of outputting a control signal to an engine of the vehicle and outputting a control signal to a transmission of the vehicle. In another aspect, the method further comprises adjusting the engine output torque limit to permit increased engine acceleration relative to a baseline in response to a decrease in frequency of acceleration and deceleration of the vehicle, and adjusting the engine output torque limit to permit decreased engine acceleration relative to the baseline in response to an increase in frequency of the sensed at least one acceleration and deceleration of the vehicle. In another aspect, the method comprises adjusting the transmission shifting schedule to decrease upshift and downshift points in response to an increase in frequency of acceleration and deceleration of the vehicle, and adjusting the transmission shifting schedule to increase the upshift and downshift points in response to a decrease in frequency of the sensed at least one acceleration and deceleration of the vehicle.

In another embodiment, the present disclosure provides a method for controlling performance of a vehicle, comprising using one or more sensors to sense at least one of acceleration and deceleration of the vehicle, determining a first adjustment to at least one of an engine output torque limit and a transmission shifting schedule for the vehicle in response to the sensed at least one acceleration and deceleration, accessing data from an on-board radar system, determining a second adjustment to the at least one engine output torque and transmission shifting schedule in response to the on-board radar system data, determining a minimum adjustment in response to the first adjustment and the second adjustment, and outputting the minimum adjustment to at least one of an engine and transmission of the vehicle. In one aspect of this embodiment, determining the first adjustment comprises increasing the engine output torque limit in response to a decrease in a frequency of the sensed at least one acceleration and deceleration of the vehicle, and decreasing the engine output torque limit in response to an increase in the frequency of the sensed at least one acceleration and deceleration of the vehicle. In another aspect, determining the first adjustment comprises increasing up/down shift points of the transmission shifting schedule in response to a decrease in a frequency of the sensed at least one acceleration and deceleration of the vehicle, and decreasing the up/down shift points in response to an increase in the frequency of the sensed at least one acceleration and deceleration of the vehicle. In still another aspect, the method further comprises using the one or more sensors to sense a position of a brake pedal of the vehicle, and determining the first adjustment in response to the sensed brake pedal position.

In yet another embodiment, the present disclosure provides a system for controlling performance of a vehicle, comprising one or more sensors to sense at least one of acceleration and deceleration of the vehicle, an engine, a transmission, and an electronic control module ("ECM") in communication with the one or more sensors, the engine and the transmission; the ECM being configured to adjust at least one of an engine output torque limit for the engine and a transmission shifting schedule for the transmission in response to the sensed at least one acceleration and deceleration. In one aspect of this embodiment, the ECM is further configured to increase the engine output torque limit in response to a decrease in a frequency of the sensed at least one acceleration and deceleration of the vehicle and decrease the engine output torque limit in response to an increase in the frequency of the sensed at least one acceleration and deceleration of the vehicle. In another aspect, the ECM is further configured to increase up/down shift points of the transmission shifting schedule in response to a decrease in a frequency of the sensed at least one acceleration and deceleration of the vehicle and decrease the up/down shift points in response to an increase in the frequency of the sensed at least one acceleration and deceleration of the vehicle.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
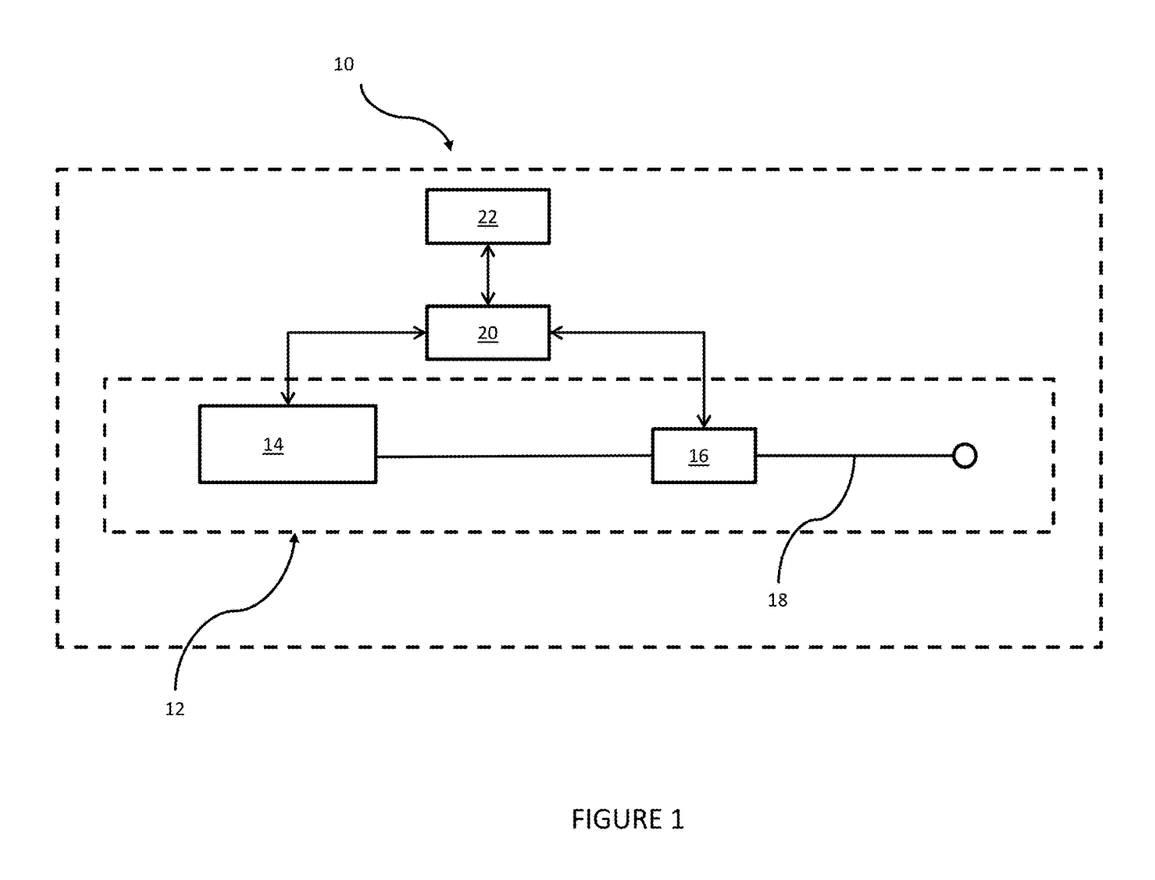
FIG. 1 is a schematic diagram of components of a vehicle.

Referring now to FIG. 1, a schematic diagram of portions of a vehicle 10 is shown. In general, vehicle 10 includes a powertrain 12 that includes a variety of components. In the figure, only the engine 14, the transmission 16 and the driveline 18 are shown. As indicated, engine 14, which generates power for vehicle 10, is coupled to transmission 16. In vehicles having automatic transmission, transmission 16 performs the upshifting and downshifting functions. Transmission 16 also transmits the torque generated by engine 14 to driveline 18. Driveline 18 is coupled to one or more axles (not shown) of vehicle 10. Rotation of driveline 18 causes rotation of the axles and, in turn, rotation of the vehicle wheels, causing the vehicle to move.

FIG. 1 also depicts an electronic control module ("ECM") 20. ECM 20 is in communication with engine 14 and transmission 16, as well as numerous sensors and systems (collectively shown as component 22) throughout powertrain 12 and elsewhere on vehicle 10. As is further described below, ECM 20 may send control signals to engine 14 to limit output torque in response to input signals representing the sensed position of the vehicle brake pedal and/or the sensed acceleration or deceleration rates of the vehicle. As is also further described below, ECM 20 may provide control signals to transmission 16 to increase or decrease the up/down shift points in response to various input signals to reduce the number of shift events and increase fuel economy. As is known in the art, ECM 20 may include one or more processors and memory components including instructions for performing the various functions described herein.

Figure 2:
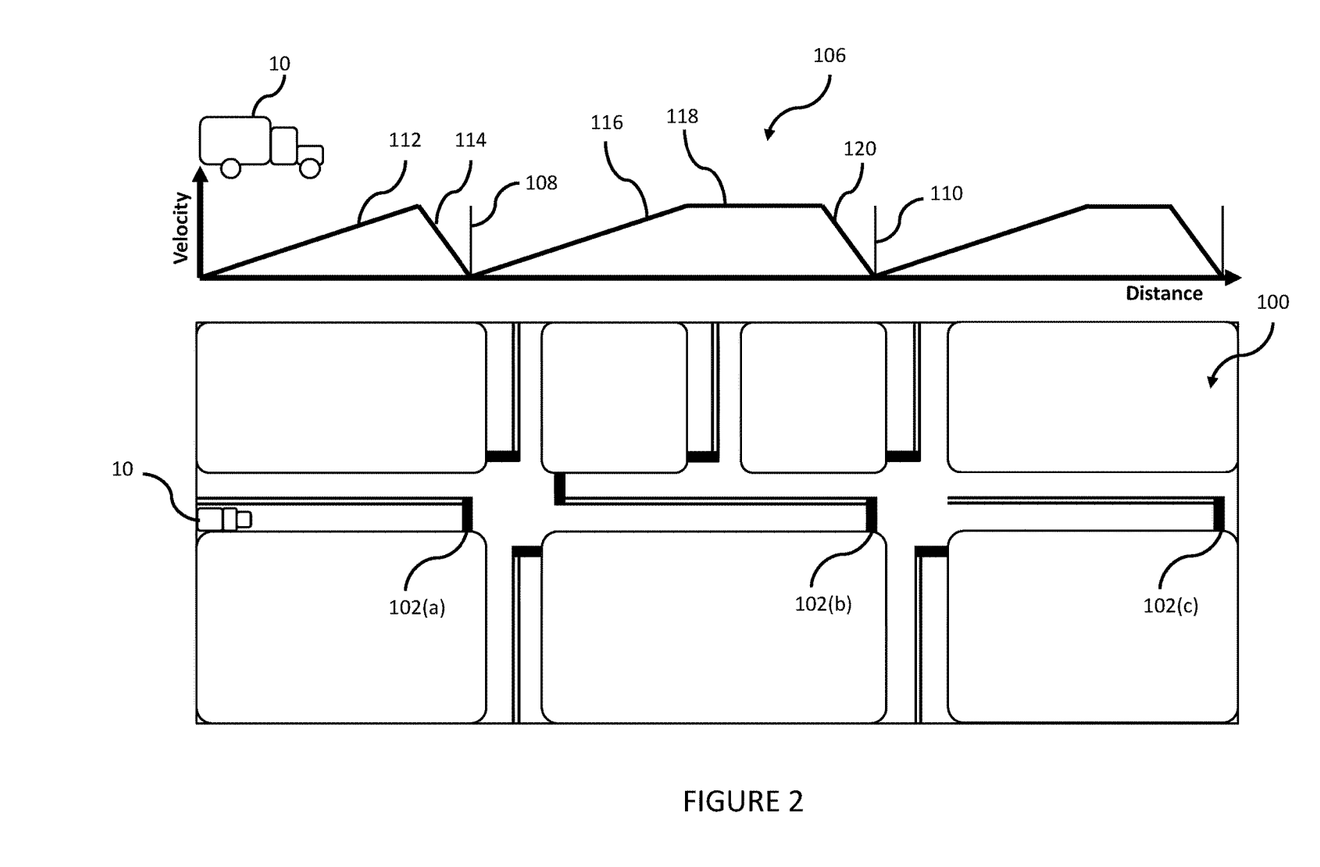
FIG. 2 is a conceptual diagram of a vehicle velocity profile.

Referring now to FIG. 2, an arbitrary roadway section 100 is shown in the lower section of the figure as including several road segments with no traffic and several stop signs. Vehicle 10 is depicted as traveling from left to right through roadway section 100, stopping at three stop signs 102(a)-(c). In the upper section of FIG. 2, a velocity profile 106 for vehicle 10 is shown as corresponding to roadway section 100. More specifically, the first vertical line 108 along the distance axis of profile 106 corresponds to stop sign 102(a), the second vertical line 110 corresponds to stop sign 102(b), and so on. Profile 106 includes several segments corresponding to vehicle acceleration, vehicle deceleration, and constant speed driving. For example, segment 112 indicates that vehicle 10 proceeded from a zero velocity and underwent constant acceleration for a first period of time. As vehicle 10 approached stop sign 102(a) (as indicated by line 108), it rapidly decelerated to a stop as indicated by segment 114. Then, vehicle 10 rapidly accelerated as indicated by segment 116, maintained a constant speed for a certain distance as indicated by segment 118, and then rapidly decelerated to a stop as it approached stop sign 102(b) as indicated by segment 120. This type of velocity profile may be representative of an operator's driving behavior in an urban setting with no traffic.

Figure 3:
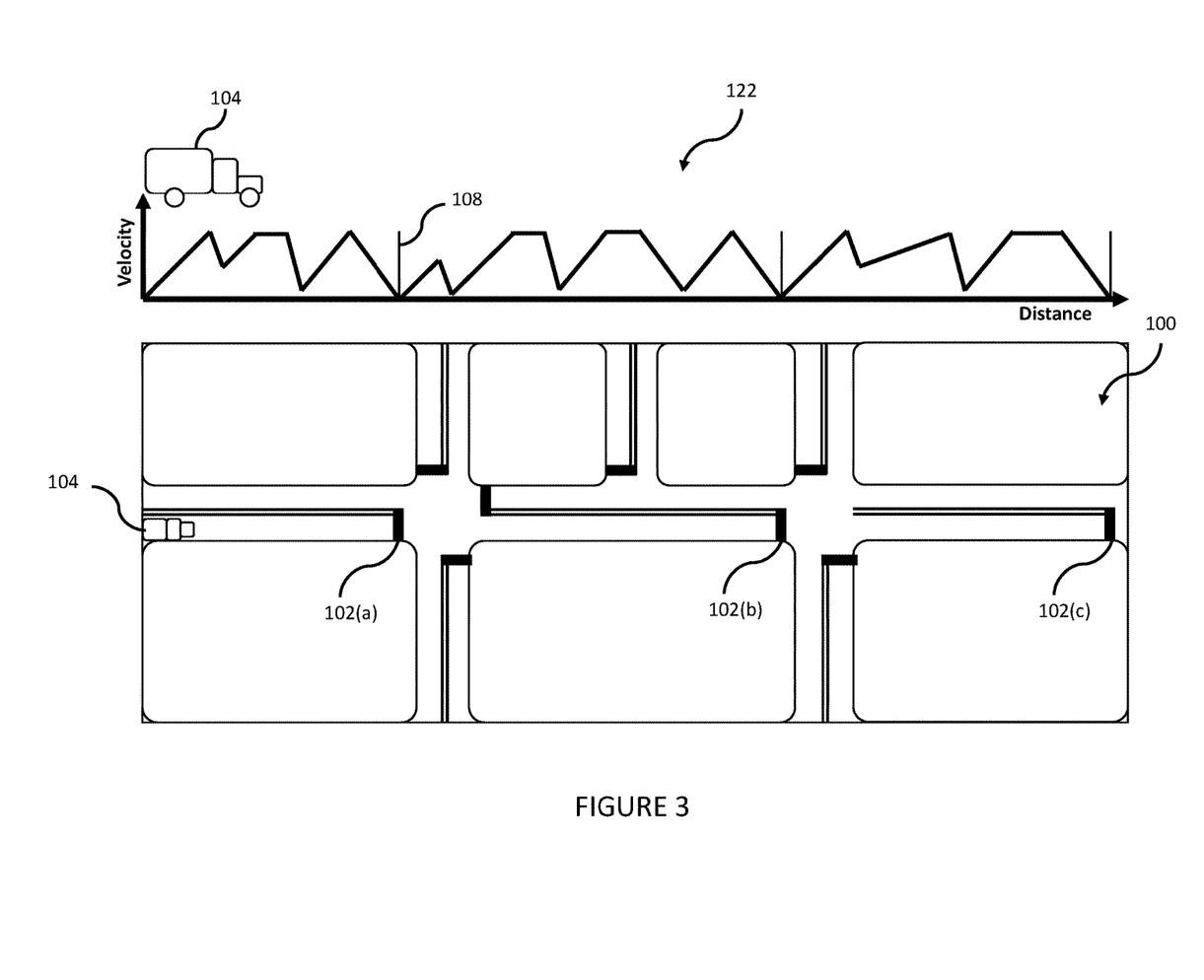
FIG. 3 is another conceptual diagram of a vehicle velocity profile.

FIG. 3 depicts an example velocity profile 122 for the same roadway section 100, but with high traffic. As shown, velocity profile 122 includes accelerations from stops and decelerations as vehicle 10 approaches a stop sign 102(a)-(c). Unlike profile 106 of FIG. 1, profile 122 also include many intermediate segments of acceleration and deceleration which reflect the operator's driving behavior in the same urban setting with the addition of high traffic.

It should be understood that in addition to the velocity profiles described above, urban vehicle operation may also have several other performance metrics that are of concern to the operator and/or owner of vehicle 10. Such performance metrics may include fuel economy (relative to a baseline), trip time (relative to a baseline), number of gear shifts per 100 miles, startability metrics (e.g., time from zero to 100 feet on a flat grade or an incline such as 6%, or maximum grade incline for a successful launch), launch metrics (e.g., time from zero to 20 MPH on a flat grade using full throttle or 75% throttle), passability metrics (e.g., time from 20 MPH to 35 MPH on a flat grade or an incline such as 6%), and gradeability metrics (e.g., maximum grade incline at 20 MPH). As will be described in greater detail below, controlling the vehicle engine torque limit and/or shift scheduling is accomplished according to the principles of the present disclosure by understanding which metric(s) is (are) important at any given time. Fuel economy may not always be the primary concern.

In one embodiment of the present disclosure, ECM 20 makes adjustments to the torque limits of engine 14 in real time to limit acceleration profiles based on brake pedal sensing and sensed acceleration/deceleration rates. In general, ECM 20 initially implements a Vehicle Acceleration limit Management ("VAM") calibrated limit. By sensing braking/deceleration frequency and rates, ECM 20 may then adjust the VAM limits as the driving environment changes. As braking/deceleration frequency and rates increase, a transfer function implemented by ECM 20 outputs decreasing VAM limits to engine 14. As the frequency and rates decrease, the VAM limits increase. This relationship may be represented by the transfer function $VAM_{Limit}=fn(V_{braking}, V_{deceleration}, R_{deceleration})$. In one embodiment of the disclosure, the transfer function may be implemented in a variety of ways, including a simple mathematical formulation using look up tables in ECM 10 memory or elsewhere, fuzzy/crisp logic rules, or esoteric formulations such as neural networks.

ECM 20 may also provide control signals to transmission 16 to launch and operate in higher gears (i.e., earlier shifts) to reduce the number of shift events and increase fuel economy. The shifting profile in this embodiment may be adjusted in the manner described above with reference to the VAM limits. In other words, as braking/deceleration frequency and rates increase, a transfer function implemented by ECM 20 outputs decreasing up/down shift points. As the frequency and rates decrease, the up/down shift points increase. This relationship may be represented by the transfer function up/down shift point=$fn(v_{braking}, v_{deceleration}, R_{deceleration})$.

In another embodiment, instead of a transfer function as described above for adjusting VAM limits and/or shift schedules, system dynamics based on an optimization function may be used. For example, an offline system ID (model setup, excite and measure) may be used to characterize VAM limit and/or shift schedule adjustments based on physical system modeling. In such an embodiment, traffic load may be modelled in a partially random manner to help simulate and analyze. Vehicle mass, road grade, and power requirements may be factored into the model to account for losses (aerodynamic, tire and driveline, such as powertrain losses). A sensitivity study may be useful in creating the appropriate system model. Such a study would consider critical sources of variation and impact to performance parameters. Data from the study could also be used to assess the excitation characteristics required in real time to determine unknown coefficients to the model. Additionally, an appropriate convergence tool (e.g., Kalman observer, RLS, etc.) could be used to lock down unknown coefficients in real time.

Figure 4:
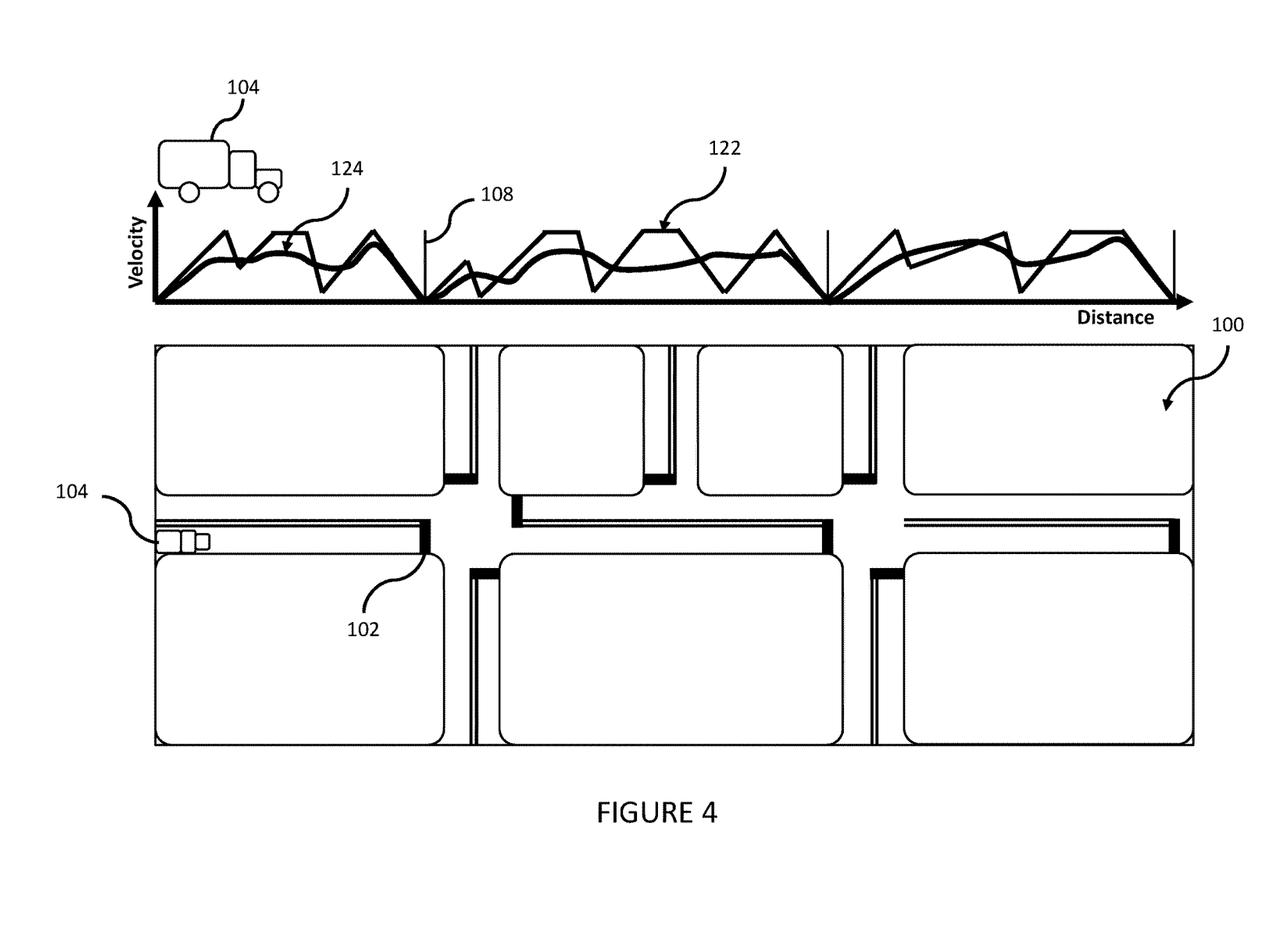
FIG. 4 is another conceptual diagram of the vehicle velocity profile of FIG. 3 showing an improved profile according to principles of the present disclosure.

Referring now to FIG. 4, an example outcome of the previously described process is depicted as the adjusted velocity profile 124. As shown, profile 124 results in the same trip time as profile 122, but with improved fuel economy resulting from less aggressive velocity changes and lower constant speeds.

In another embodiment of the present disclosure, an on-board vehicle radar system (depicted as item 22 in FIG. 1) is used as an input to ECM 20 for real time adjustment of VAM limits and/or shift schedules. This input may be used in addition to the pedal sensing and acceleration/deceleration sensing described above. In such an embodiment, the initial acceleration profile results from an initial, calibrated VAM limit. Using on-board radar system 22, data characterizing the degree of traffic in the vicinity of vehicle 10 may be obtained. More specifically, radar system 22 may measure neighboring vehicle size, velocity and acceleration rates. The behavior represented by the observed data may be compared against a "database" of expected/known behaviors to determine the degree to which the traffic conditions are off-nominal. The database may contain a measure of vehicle size against expected acceleration behavior derived from one or more of a variety of stochastic measures.

In this embodiment, congestion may also be estimated using information from side, front, rear proximity sensors (also depicted as item 22 in FIG. 1). Generally speaking, the more time vehicle 10 is surrounded by other vehicles, the more likely vehicle 10 is in a higher traffic environment. Similarly, the more time vehicle 10 is surrounded by other slower moving/accelerating vehicles, the more likely vehicle 10 is in a higher traffic environment. As traffic congestion rates change, similar transfer functions as those described above may be used to determine the impact to VAM limits and/or shift scheduling. This can either be implemented as a separate limiting function or blended into the function of the above-described embodiments. Given that this is a real time measurement of forward conditions, vehicle coasting solutions may also be employed as described below.

Figure 5:
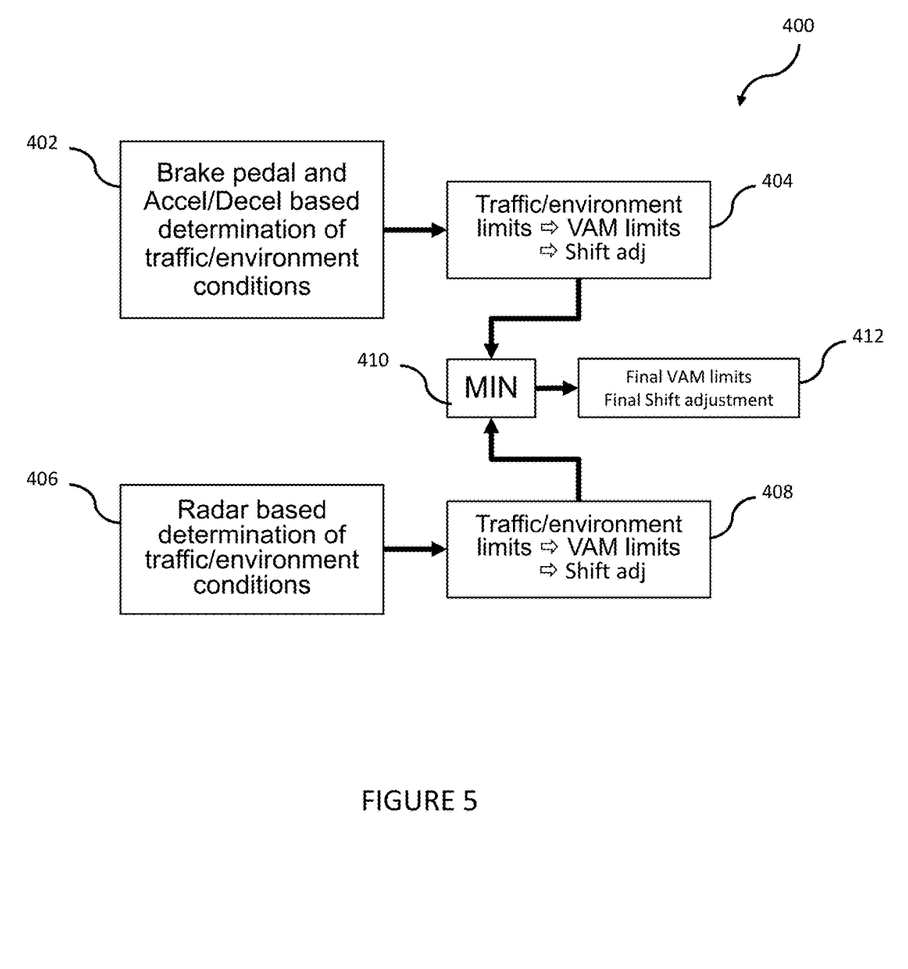
FIG. 5 is a flow diagram of a method for controlling an engine according to principles of the present disclosure.

FIG. 5 is a flow diagram of one approach to combining the above-described radar information with the above-described brake pedal and acceleration/deceleration information. In method 400, brake pedal and acceleration/deceleration inputs are obtained by ECM 20 to determine current environmental conditions at step 402. At step 404, this input data is used in the manner described above to adjust VAM limits and/or shift schedules. Similarly, at step 406, radar data is obtained by ECM 20 to determine current environmental conditions. At step 408, that data is used in the manner described above to adjust VAM limits and/or shift schedules. The VAM limits and/or shift schedules from steps 404 and 408 are compared by ECM 20 at step 410 to determine the minimum adjusted VAM limits and/or shift schedules, which are outputted by ECM 20 to engine 14 and/or transmission 16 at step 412 as the final VAM limits and/or shift schedules.

Figure 6:
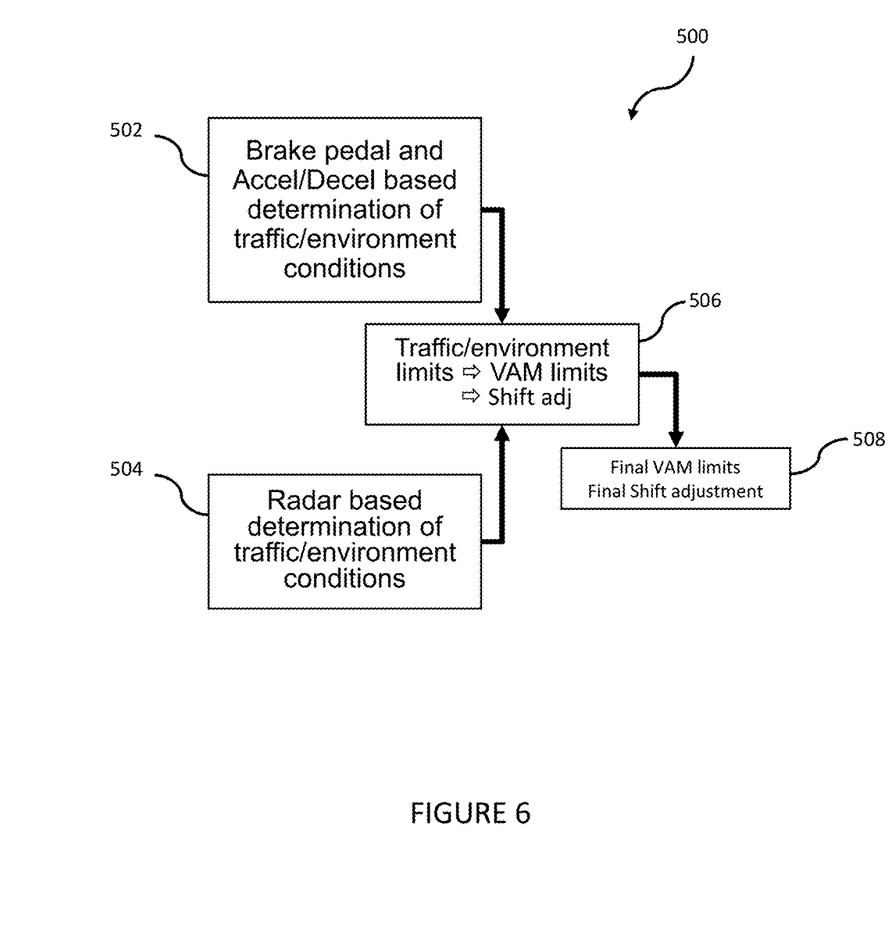
FIG. 6 is another flow diagram of a method for controlling an engine according to principles of the present disclosure.

FIG. 6 depicts an alternative method for combining the above-described radar information with the above-described brake pedal and acceleration/deceleration information. In method 500, brake pedal and acceleration/deceleration inputs are obtained by ECM 20 to determine current environmental conditions at step 502. Similarly, at step 504, radar data is obtained by ECM 20 to determine current environmental conditions. At step 506, the data from both sources is used by ECM 20 in the manner described above to adjust VAM limits and/or shift schedules. The VAM limits and/or shift schedules from steps 506 are outputted at step 508 by ECM 20 to engine 14 and/or transmission 16 as the final VAM limits and/or shift schedules.

In yet another embodiment, another set of input data may be used instead of or in addition to the input sources described above for adjusting VAM limits and/or shifting schedules. In this embodiment, enhanced navigation data may be used such as that available from the eHorizon system produced by Continental. Such a system (depicted as item 22 in FIG. 1) may be connected to ECM 20 to provide data regarding roadways, up upcoming intersections, stop signs, etc., for use in creating an expectation of vehicle stopping needs. For example, knowledge of intersections which involve a potential stop location can be used to plan maximum vehicle acceleration, speed limits, and/or transmission shift schedules to minimize fuel usage while minimizing impact to trip time and/or other drivability metrics. Such information provides a true representation of the roadway section. Unlike the embodiment described below, this embodiment has no information of the true stop condition at the intersection (i.e., for a traffic light). Additionally, there is no information on the duration of the stop event. Thus, optimization may be limited to the distance domain.

In this embodiment, ECM 20 can adjust the transmission shift schedules based on expected road grade and/or traffic conditions. For example, negative grades may result in skip shift at launch, or skip shift during motion. Positive grades, on the other hand, may result in longer duration in lower gears to maintain higher reserve power and/or actual driveline power. Traffic conditions are factored to assess how long one can expect to stay on the particular horizon of grades. For example, lower traffic would result in more quickly traversing a given segment as compared to higher traffic conditions. This knowledge is directly used to increase the measures of the current performance variables.

In yet another embodiment of the present disclosure, a fourth input source is provided for use in adjusting VAM limits and/or shifting schedules. This input may also be used in addition to or instead of the previously described inputs. The fourth input includes a traffic light sensing/status system (depicted as item 22 in FIG. 1) which communicates the status of upcoming traffic lights (i.e., red, yellow, green) to ECM 20. ECM 20 may then adjust the VAM limits and/or shifting schedule of vehicle 10 to improve the operational characteristics of vehicle 10.

Figure 7A:
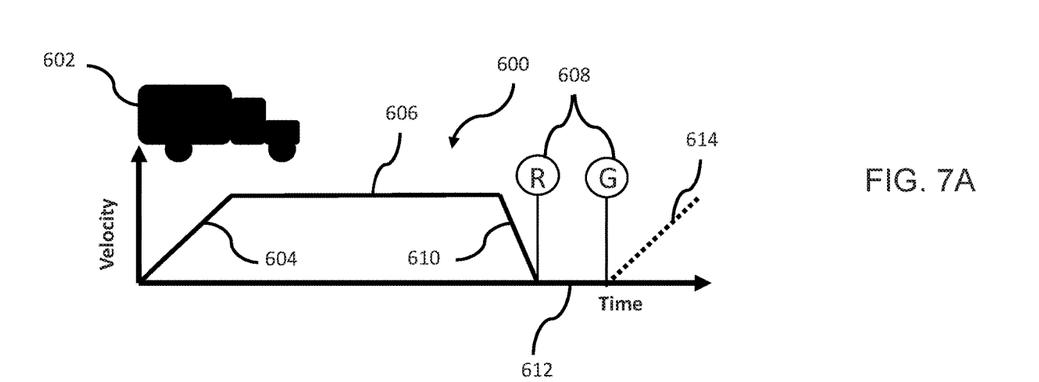
FIG. 7A is a conceptual diagram of velocity profiles.

Referring now to FIG. 7(A), a velocity profile 600 is shown. In profile 600, vehicle 602 accelerates from a stop at time zero as indicated by segment 604 until it reaches a desired speed as indicated by segment 606. Vehicle 602 continues at this constant speed until it approaches stop light 608 in its RED state, whereupon vehicle 602 decelerates as indicated by segment 610. Vehicle 702 then waits at light 608 (as indicated by segment 612) until light 608 transitions to its GREEN state. At that time, vehicle 602 accelerates as indicated by segment 614.

Figure 7B:
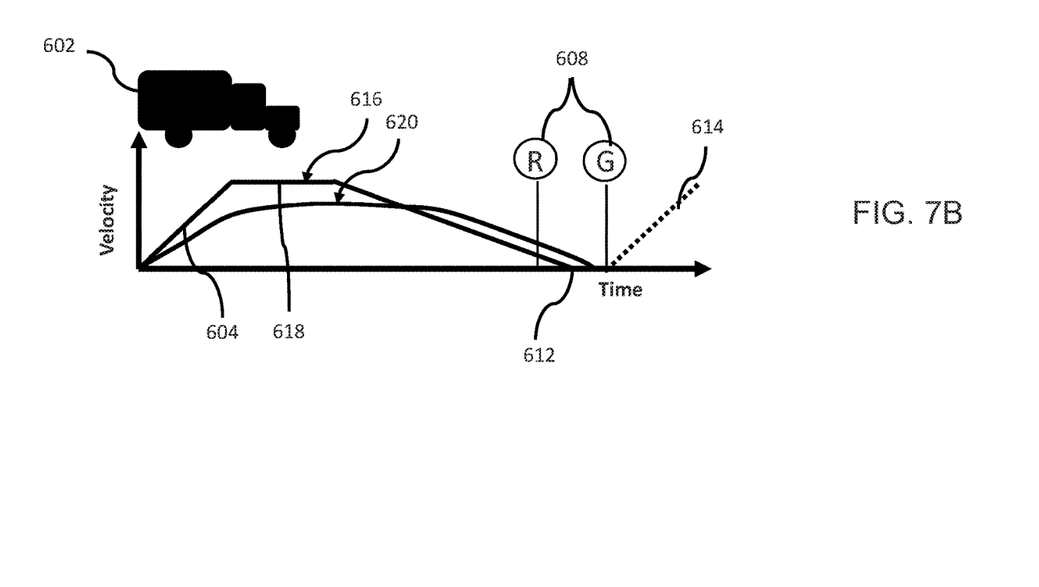
FIG. 7B is a conceptual diagram of velocity profiles.

FIG. 7(B) depicts two improved velocity profiles that result from use of the present disclosure. Profile 616 represents use of enhanced navigation as described above in conjunction with traffic light sensing. As shown, segment 604 is the same in profile 616 as in profile 600. While segment 618 represents the same constant speed as segment 606 of profile 600, segment 718 is substantially shorter in profile 616. This is a result of the use of enhanced navigation data reflecting the distance to stop light 608 and traffic light sensing data reflecting the status of stop light 608. In other words, as ECM 20 can determine, based on these inputs, that stop light 608 will not be in the GREEN state until the time depicted in FIG. 7(B), ECM 20 can implement the principles of the present disclosure (i.e., formulate new VAM limits and/or shifting schedules) to cause earlier deceleration of vehicle 10 which results in improved fuel economy with no impact on trip time. Profile 620 is even further improved relative to profile 616. Profile 620 results from the same knowledge of the driving environment as described above, but also includes a reduction in acceleration and constant speed, further improving fuel economy without impacting trip time.

In the above-described embodiment, traffic light status facilitates knowledge of stopping requirements such as distance to stop light 608 using enhanced navigation data and stop duration (using light status data). It should be understood that the velocity profiles may be adjusted based on data representing a single road segment or even a longer horizon. Although vehicle speed is not directly controlled, the engine torque limits are changed to drive toward improved vehicle 10 behavior. Moreover, powertrain 12 behavior may also be considered, as well as coasting opportunities, engine torque/power output, and duration of stop time (to minimize impact to trip time). On-board radar system 22 may be employed to identify correct stopping distance due to traffic.

Coasting opportunities may be embodied using several different mechanisms including active idle state management, engine stop/start during coasting, engine zero load control, gear based coast-down, and transmission designed with specific gears for coasting. These embodiments require appropriate transmission interface and coordination by ECM 20.

In yet another embodiment according to the present disclosure, telematics are used as an input instead of or in addition to the input sources described above. Such telematics would support V2X (i.e., vehicle-to-vehicle, vehicle-to-grid, vehicle-to-server, etc.) communication and ECM 20 adjustments to VAM limits and/or shift schedules based on incoming information. Inter-vehicle communication (e.g., Intelligent Transportation Systems) may be used to provide information of upcoming traffic/environment conditions to ECM 20. Use of telematics provides several opportunities for improved vehicle performance, including enabling use of an application specific customer calibration tool and assist system for in-field calibration optimization of relevant ECM features, active performance monitoring system with the added capability for in-use performance monitoring, PM and diagnostics, vehicle load management which provides a cargo trajectory for a given cargo unit, the cargo trajectory being a route and delivery device selected from various routes and delivery devices, wherein the cargo trajectory improves the outcome of, or optimizes, a cost function, V2V convoy operation which provides a series of mechanisms to create both "parasitic" and "cooperative" solutions for multi-vehicle tandem operation, and V2X optimal route planning which is an extension of "Load Pooling" and "Tandem Operation" to provide solutions that factor in terrain, weather, time-of-day, stopping points for unload/reload, etc. Real time solutions may be uploaded with V2X communication to predict traffic, wind, etc.

As with the other above-described input sources, use of telematics permits adjustment to VAM limits and/or shifting schedules by ECM 20 in response to sensed or received data. In one embodiment, the initial acceleration profile may be an initial calibrated VAM limit. Thereafter, the limits may be adjusted using back office data mining. Observations of inputs (such as those from the other above-described input sources) may be used through V2S mechanisms to determine the optimal torque limit set points given a particular operator's driving style. Real time adjustments may be conducted on-board, while slower macro changes may be conducted off-board. Unlike the earlier data sources, V2V communication indicates an effective reduction in speed required, resulting in vehicle slowdown or limited acceleration (torque limit reduction). This may be directly extended to shift schedule adjustments that may also consider the operating characteristics of vehicle 10 based on driving history. This assessment process assists the system in determining the critical performance variables through model based performance metric "system identification" methods.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling performance of a vehicle, comprising:
   using one or more sensors to sense at least one of acceleration and deceleration of the vehicle; and
   using an electronic control module ("ECM") to adjust at least one of an engine output torque limit and a transmission shifting schedule for the vehicle in response to the sensed at least one acceleration and deceleration;
   wherein using an ECM to adjust at least one of an engine output torque limit and a transmission shifting schedule comprises:
      increasing the engine output torque limit in response to a decrease in a frequency of the sensed at least one acceleration and deceleration of the vehicle and
      decreasing the engine output torque limit in response to an increase in the frequency of the sensed at least one acceleration and deceleration of the vehicle.

2. The method of claim 1, wherein using an ECM to adjust at least one of an engine output torque limit and a transmission shifting schedule comprises:
   increasing up/down shift points of the transmission shifting schedule in response to a decrease in a frequency of the sensed at least one acceleration and deceleration of the vehicle and
   decreasing the up/down shift points in response to an increase in the frequency of the sensed at least one acceleration and deceleration of the vehicle.

3. The method of claim 1, further comprising:
   accessing data from an enhanced navigation system; and
   using the ECM to adjust the at least one engine output torque and transmission shifting schedule in response to the enhanced navigation system data.

4. The method of claim 3, wherein the data from the enhanced navigation system includes an indication of at least one intersection ahead of the vehicle.

5. The method of claim 1, further comprising:
   accessing data from a traffic light sensing system; and
   using the ECM to adjust the at least one engine output torque and transmission shifting schedule in response to on the traffic light sensing system data.

6. The method of claim 5, wherein the data from the traffic light sensing system includes an indication of a status of at least one traffic light ahead of the vehicle.

7. The method of claim 1, further comprising:
   accessing data from a telematics system, the data including an indication of traffic conditions ahead of the vehicle; and
   using the ECM to adjust the at least one engine output torque and transmission shifting schedule in response to the telematics system data.

8. The method of claim 1, further comprising:
   adjusting the engine output torque limit to permit increased engine acceleration relative to a baseline in response to a decrease in frequency of acceleration and deceleration of the vehicle; and
   adjusting the engine output torque limit to permit decreased engine acceleration relative to the baseline in response to an increase in frequency of the sensed at least one acceleration and deceleration of the vehicle.

9. The method of claim 1, further comprising:
   adjusting the transmission shifting schedule to decrease upshift and downshift points in response to an increase in frequency of acceleration and deceleration of the vehicle; and
   adjusting the transmission shifting schedule to increase the upshift and downshift points in response to a decrease in frequency of the sensed at least one acceleration and deceleration of the vehicle.

10. A system for controlling performance of a vehicle, comprising:
    one or more sensors to sense at least one of acceleration and deceleration of the vehicle;
    an engine;
    a transmission; and
    an electronic control module ("ECM") in communication with the one or more sensors, the engine and the transmission; the ECM being configured to adjust at least one of an engine output torque limit for the engine and a transmission shifting schedule for the transmission in response to the sensed at least one acceleration and deceleration;
    wherein the ECM is further configured to increase up/down shift points of the transmission shifting schedule in response to a decrease in a frequency of the sensed at least one acceleration and deceleration of the vehicle and decrease the up/down shift points in response to an increase in the frequency of the sensed at least one acceleration and deceleration of the vehicle.

11. The system of claim 10, wherein the ECM is further configured to increase the engine output torque limit in response to a decrease in a frequency of the sensed at least one acceleration and deceleration of the vehicle and decrease the engine output torque limit in response to an increase in the frequency of the sensed at least one acceleration and deceleration of the vehicle.

12. The system of claim 10, wherein the one or more sensors are configured to sense a position of a brake pedal of the vehicle, and the ECM is further configured to adjust the at least one engine output torque and transmission shifting schedule in response to the sensed brake pedal position.

13. The system of claim 10, further comprising:
an on-board radar system; and
wherein the ECM is configured to receive data from the on-board radar system and to adjust the at least one engine output torque and transmission shifting schedule in response to the on-board radar system data.

14. The system of claim 13, wherein the ECM is configured to adjust the at least one engine output torque and transmission shifting schedule in response to the on-board radar system data by comparing the on-board radar system data to expected data representing expected characteristics of neighboring vehicles to determine an extent to which traffic conditions are off-nominal.

15. The system of claim 10, further comprising:
one or more proximity sensors mounted to the vehicle to determine a current traffic environment; and
wherein the ECM is configured to receive data from the one or more proximity sensors and to adjust at least one of an engine output torque limit and a transmission shifting schedule in response to the data from the one or more proximity sensors.

16. The system of claim 10, wherein the ECM is further configured to output at least one of a control signal to an engine of the vehicle and a control signal to a transmission of the vehicle.

* * * * *